Figure 1:
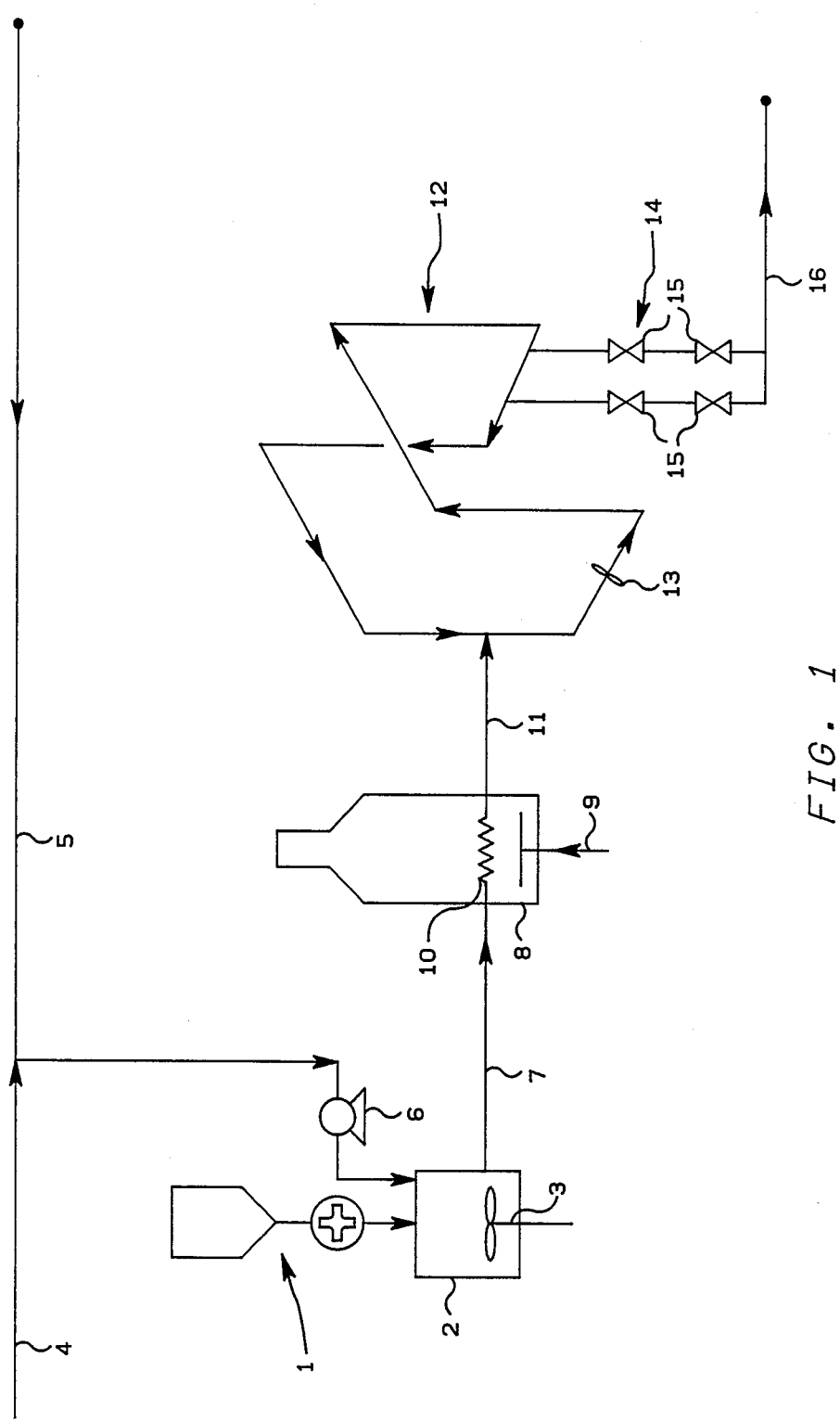

United States Patent [19]

Scinta

[11] Patent Number: 4,741,806
[45] Date of Patent: May 3, 1988

[54] SOLVENT EXTRACTOR

[75] Inventor: James Scinta, Bartlesville, Okla.

[73] Assignee: Phillips Petroleum Company, Bartlesville, Okla.

[21] Appl. No.: 591,757

[22] Filed: Mar. 21, 1984

Related U.S. Application Data

[62] Division of Ser. No. 475,991, Mar. 16, 1983, Pat. No. 4,448,669.

[51] Int. Cl.$^4$ .............................................. B01D 11/02
[52] U.S. Cl. ................................. 196/14.52; 422/269; 422/281
[58] Field of Search ............... 208/8 LE, 11 LE, 8 R, 208/11 R; 196/14.52; 422/269, 281

[56] References Cited

U.S. PATENT DOCUMENTS

| | | |
|---|---|---|
| T 861,703 | 4/1969 | Long et al. |
| 1,529,505 | 3/1925 | Reilly .................... 196/14.52 |
| 2,913,388 | 11/1959 | Howell et al. ............ 208/8 LE |
| 3,509,037 | 4/1970 | Tse ...................... 208/11 LE |
| 4,139,450 | 2/1979 | Hanson et al. ........... 208/11 LE |
| 4,167,470 | 9/1979 | Karnofsky ............... 208/8 LE |
| 4,322,284 | 3/1982 | Tsai et al. ............. 208/8 LE |
| 4,325,803 | 4/1982 | Green et al. ............ 208/11 LE |
| 4,347,118 | 8/1982 | Funk et al. ............. 208/11 LE |

Primary Examiner—David L. Lacey
Assistant Examiner—Joye L. Woodard
Attorney, Agent, or Firm—Williams, Phillips & Umphlett

[57] ABSTRACT

Supercritical extraction of diatomaceous earth results in a much more significant improvement in hydrocarbon recovery over Fischer retorting than achievable with tar sands. Process and apparatus for supercritical extraction of diatomaceous earth are disclosed.

1 Claim, 4 Drawing Sheets

SOLVENT EXTRACTOR

This is a division of application Ser. No. 475,991, filed Mar. 16, 1983, now U.S. Pat. No. 4,448,669, issued May 15, 1984.

The present invention relates to the recovery of hydrocarbon values such as oil from minerals. In a more specific aspect this invention relates to the extraction of diatomite or diatomaceous earth. A yet more specific aspect of this invention is an apparatus for recovery of hydrocarbons from diatomaceous earth.

BACKGROUND OF THE INVENTION

With the increasing difficulty of finding and producing oil from oil bearing rock formations other sources of hydrocarbons have been subject to intense investigation in recent years. Tar sands, oil shale, coal and lignite are just some examples of such other hydrocarbon sources. Many processes have been described in the art for recovery of hydrocarbon from such minerals and/or for the conversion of such minerals into recoverable hydrocarbons. It is known that diatomaceous earth can be an attractive candidate for hydrocarbon recovery. The prior art describes solvent extraction of oil from diatomite ore. Such a process is described in U.S. Pat. No. 4,239,617. This prior art process utilizes a solvent extraction wherein a micella of oil in hydrocarbon solvent is mixed with the diatomite and the slurry is heated to near the boiling point of the solvent.

THE INVENTION

It is one object of this invention to provide a process for recoverying hydrocarbons from diatomaceous earth.

A further object of this invention is to provide a highly effective solvent extraction process allowing a high recovery percentage of hydrocarbons while permitting simple separation steps to separate the solvent and the recovered hydrocarbons from the remaining solids of diatomite ore.

A yet further object of this invntion is to provide an apparatus for effective recovery of hydrocarbons from diatomaceous erath.

Figure 2:
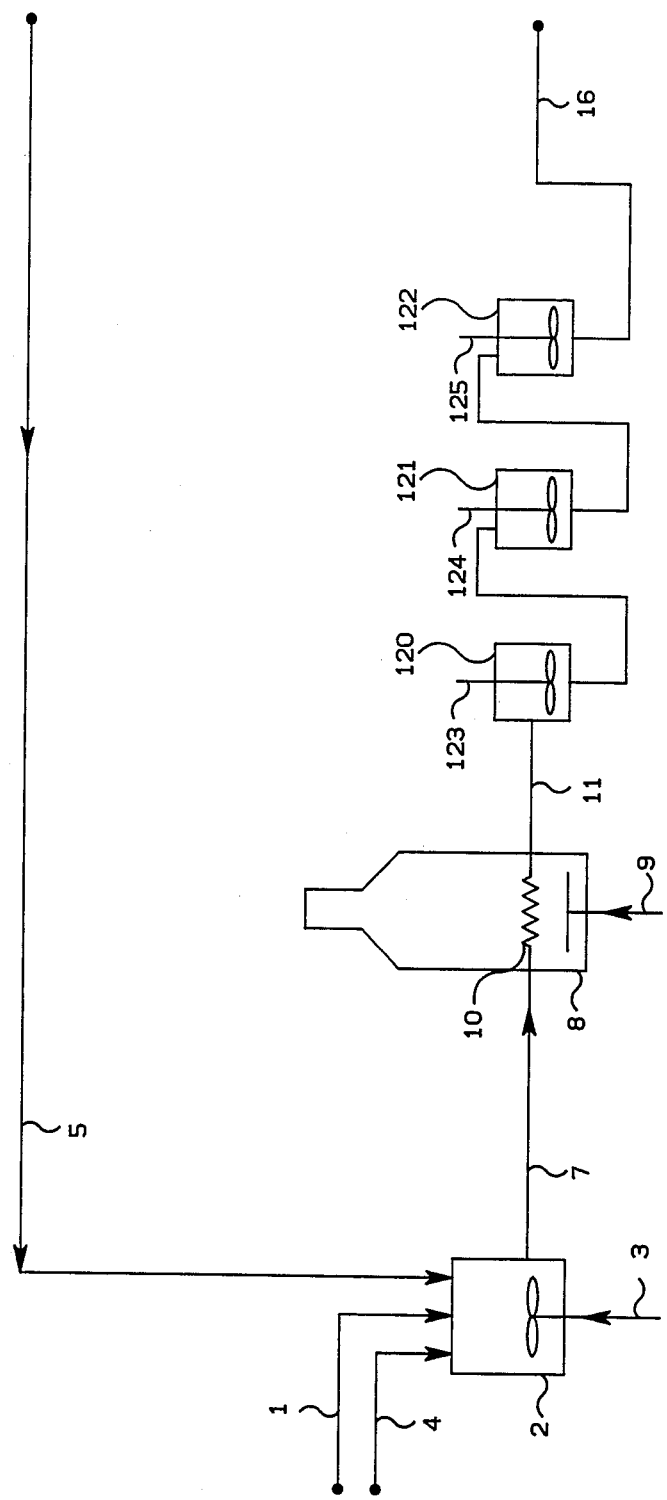
Figure 3:
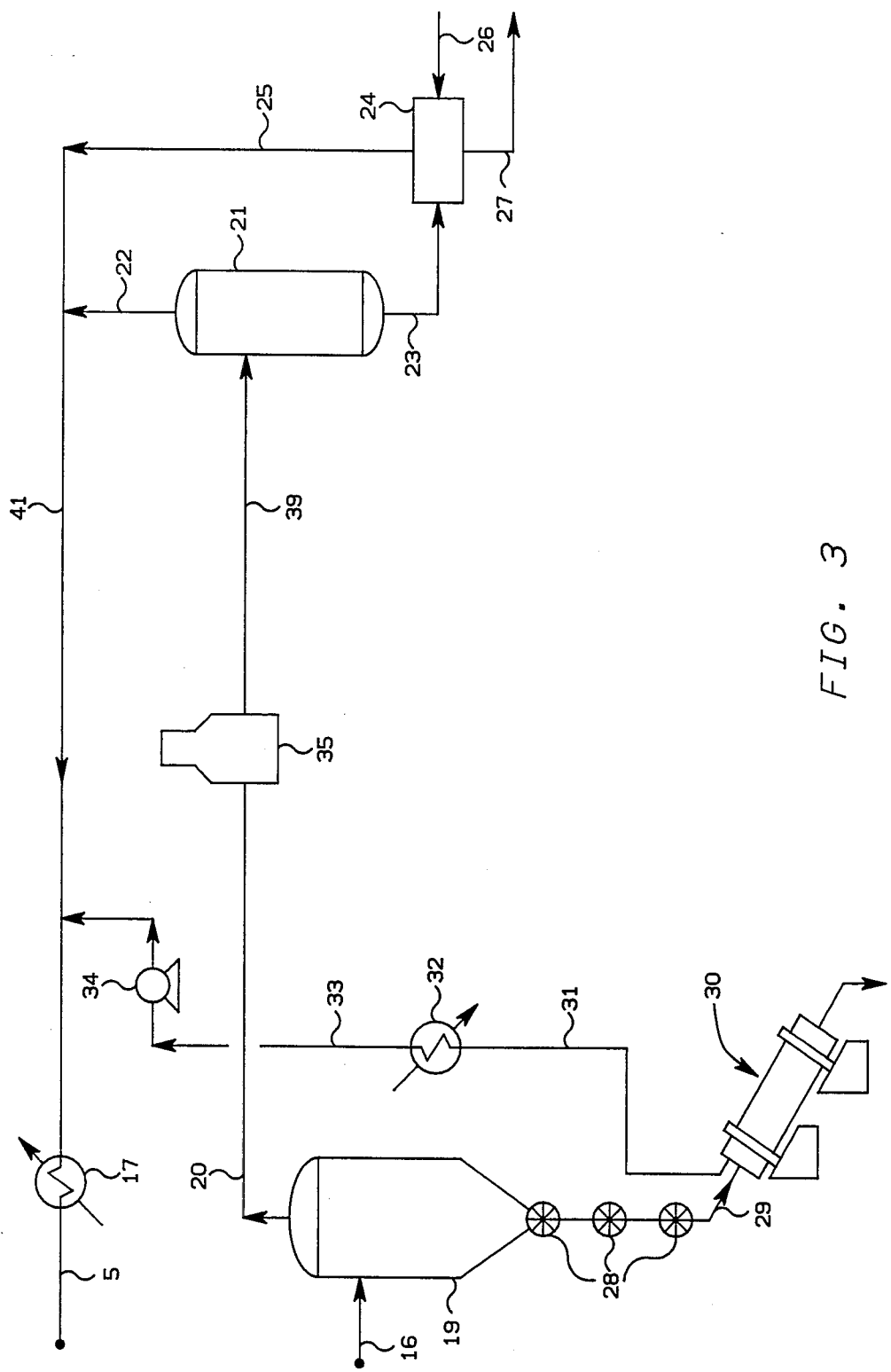
Figure 4:
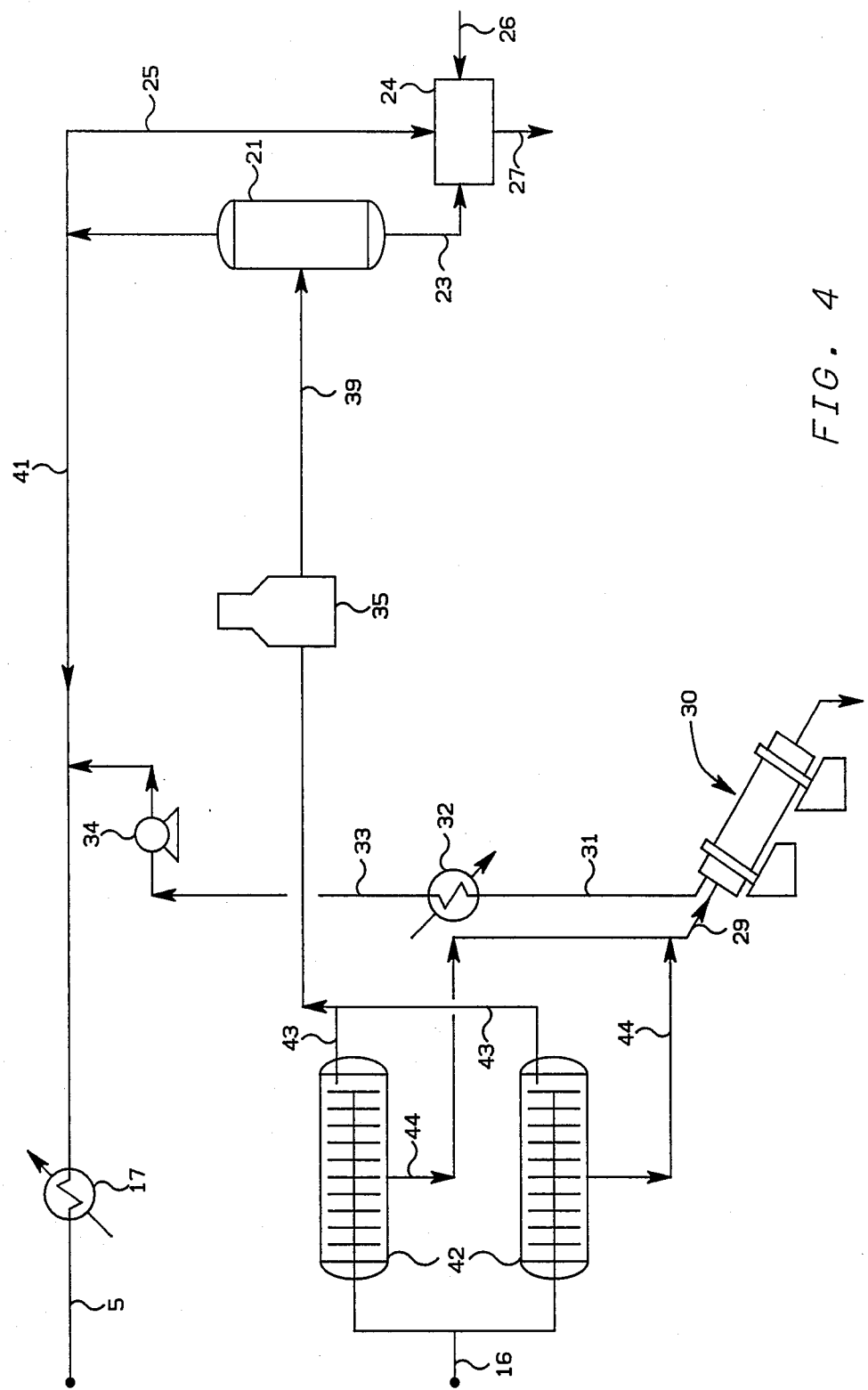

These and other objects, advantages, details and features of this invention will become apparent to those skilled in the art from the following detailed description of the invention, the appended claims and the drawings in which FIGS. 1 and 2 are a schematic view of the solvent extraction stage of the process and apparatus of this invention, FIGS. 3 and 4 are a schematic view of the separation stage of the process and apparatus of this invention.

In accordance with this invention a process for recovering hydrocarbon values from diatomaceous earth is provided. This process involves the step of subjecting a mixture of diatomaceous earth containing recoverable hydrocarbons and a solvent to supercritical conditions with respect to the solvent. The second step of the process of this invention is to separate the fluid phase comprising at least a portion of the solvent used and at least some of said recoverable hydrocarbon values from a solid phase comprising at least some of the remaining diatomaceous earth particles.

It has surprisingly been found that supercritical extraction appears to be uniquely suited for the extraction of diatomaceous earth. While supercritical extraction of tar sand also improve hydrocarbon yield as compared to Fischer assay recovery, the improvement using supercritical extraction of diatomaceous earth compared with Fischer retorting was almost 16% higher than the comparable improvement achieved with tar sand under essentially identical conditions. This so established substantially different behavior of diatomaceous earth as compared to tar sand was unexpected and unpredictable. The process of this invention thus makes possible a very substantial increase in hydrocarbon recovery from diatomaceous earth. It appears that diatomaceous earth is uniquely susceptible to supercritical extraction.

DIATOMACEOUS EARTH

Unladen diatomaceous earth of diatomite is a light friable silicious material derived chiefly from diatom remains. Diatoms are minute planktonic unicellar or colonial algea with silicified skeletons that form diatomite. It is also called Kieselguhr or Infusorial Earth. It is a soft, white, earthy deposit of hydrated silica, being the siliceous skeletons of minute aquatic plants known as diatoms, found at Digby Neck in Canada, in Germany, the United States, and many other parts of the world. It is generally associated with earthy impurities, and contains from 65 to 87 percent $SiO_2$, 2.3 to 11.7 percent, $Al_2O_3$, up to 3 percent $Fe_2O_3$, small proportions of the oxides of calcium, magnesium, potassium, and sodium, and from 5 to 14 percent water.

It is of great absorbent capacity, one variety being capable of taking up about four times its own weight of water and having a sp. gr. of about 0.33. Calcination is often resorted to for the removal of organic matter and improvement of color.

Diatomaceous earth, after at least a substantial portion of the hydrocarbonaceous material has been removed therefrom by the process of this invention, has the properties of 75-80% internal porosity, 25-50% external void fraction, 17-30 lb/cu ft bulk dry density and a surface area of 1.2 to 50 square meters/gram. The preferred oil laden diatomaceous earth has the property that the oil is on the surface of the diatomaceous earth, i.e. that the diatomite is oil wet.

The above listed properties of diatomaceous earth are determined in accordance with the following procedures:

Crystalline or skeletal density is calculated from composition of diatomaceous earth. In the above it is about 123 lb/cu ft. A mercury porosimetry procedure can also be used to determine crystalline or skeletal density. Relationships are as given:

$$\epsilon = 1 - (\rho_b/\rho_p) \qquad \text{(Eq. 1)}$$

$$x = 1 - (\rho_p/\rho_c) \qquad \text{(Eq. 2)}$$

$\rho_p$ = particle density determined by liquid nitrogen displacement x = internal porosity: calculated by Eq. 2 from particle density and skeletal or crystalline density by composition analysis $\epsilon$ = external void fraction: calculated by Eq. 1 from bulk density and particle density by liquid $N_2$ displacement $\rho_b$ = bulk dry density: ASTM 1982, part 25, Desig. D4164-62, 1180-1181 surface area: ASTM 1978, part 25, Desig. D3663-78, pp. 808-812

$\rho_c$ = crystalline or skeletal density calculated from composition or determined by mercury porosimetry

EXTRACTION PROCESS

The process of this invention involves supercritical extraction of diatomaceous earth with a solvent under supercritical conditions with respect to the solvent and separating the fluid phase of the supercritical extraction from a solid phase.

The temperature of the extraction step is more typically up to 150° C., preferably about 20° C. to 50° C., above the critical temperature of the solvent. The pressure of the supercritical extraction will be generally up to 500 psi above the critical pressure; preferably the pressure will be above the tangential extrapolation of the boiling point/pressure curve for the solvent at the given temperature.

While several solvents can be used in accordance with this invention, it is presently preferred to use a substantially hydrocarbonaceous solvent having preferably 3 to 12 carbon atoms. Particularly suitable are solvents which are substantially aliphatic and have a number of 3 to 10 carbon atoms per molecule. Aromatic solvents having 5 to 12 carbon atoms and being substantially hydrocarbons can also be utilized. Examples of such solvents are pentanes, hexanes, heptanes, octanes, benzene, toluene, xylenes, tetralin and naphthalenes. Mixtures of solvents can also be used in accordance with this invention.

Among the solvents listed above, heptane and toluene are presently particularly preferred.

The separation of the solvent and hydrocarbons on the one hand and the solid residue on the other hand can be done in a variety of ways. The supercritical mixture under supercritical conditions can be adjusted to a fluid/solid separation, e.g. by filtering, centrifuging or settling. Thereafter the fluid being substantially free of solid particles can be subjected to further processing and solvent recovery while the solid phase can be subjected to one or more steps for solvent recovery, such as heating the solid mass to a temperature substantially above the boiling of the solvent utilized.

In another variation of this invention the extraction mixture containing the solvent, the extracted hydrocarbons and the remaining solids uper supercritical conditions can be subjected to a fluid/fluid separation step first, by either raising the temperature of the mixture or reducing the pressure of the mixture. This step causes an at least partial separation of the fluid material in the mixture into at least two different fluid phases. With this procedure the heavier hydrocarbon material, which may be resins and asphalt, can be removed together with the solids of the diatomaceous earth while the lighter hydrocarbon oils are recovered in the major portion of the solvent.

The mixture of solvent and extracted hydrocarbons is subjected to one or more further separation steps in which a solvent stream being substantially free of extracted hydrocarbons and a hydrocarbon material being substantially free of solvent are recovered. The solvent is recycled to the supercritical extraction step while the recovered hydrocarbons may be subjected to further processing. Also, it is preferred to subject the separated and hydrocarbon depleted diatomaceous earth to one or more solvent recovery steps. The so recovered solvent is also recycled to the supercritical extraction step.

EXTRACTION APPARATUS

Another embodiment of this invention resides in an apparatus for supercritically extracting diatomaceous earth. This apparatus comprises an inlet chamber wherein diatomaceous earth and solvent can be brought to supercritical conditions with respect to the solvent. In fluid communciation with this inlet chamber a loop reactor is provided in which the mixture of solvent and diatomaceous earth is circulated under supercritical conditions. The loop reactor is provided with at least two settling legs having means for periodic removal of materials settled in these legs. This allows the separation and removal of solvent rich mixtures of hydrocarbon depleted diatomaceous earth particles and a fluid comprising both solvent and extracted hydrocarbons. The apparatus of this invention is further provided with means for solid/fluid separation connected to the settling legs which means have a fluid outlet and a solids outlet. Separator means are connected to the fluid outlet of the solid/fluid separation means. The overhead outlet of these separator means permits the withdrawal of primarily solvent while the bottom outlet of the separator means permits the withdrawal of heavier material. The apparatus is further provided with dryer means connected to the solids outlet of the solid/fluid separating means and this dryer has a gas outlet and a solids outlet. The gas outlet is directly or indirectly connected to the inlet of the separator means. Finally, a recycle means is provided for which connects the overhead outlet of said separator means with the inlet chamber to permit recycling of the solvent.

In a second variation of the apparatus embodiment of this invention, the inlet chamber is connected to a group of at least two stirred reactors arranged in series and the means for solid/fluid separation has its inlet connected to the outlet of said stiired reactors.

It is presently preferred that a lock hopper is connected with said inlet chamber. Furthemore, a pressure pump is provided for for injecting the solvent under pressure into said inlet chamber. The mixture of diatomaceous earth and solvent can be brought to the supercritical temperature condition by passing this mixture through a heater. The heater is preferably an indirect heat exchanger Yet further preferred features, details and embodiments will become apparent from the following specific examples as well as the description of the drawing which are intended to illustrate the invention but not to unduly limit its scope.

EXAMPLE 1

Oil Bearing diatomaceous earth was supercritically extracted with n-heptane. 500 grams of oil laden diatomite ore from California U.S.A., were placed in an unstirred reactor and purged with $N_2$. Heptane was pumped at 7 grams/minute to the reactor and the reactor was heated to 400° C.(752° F.), and 1500 psig. This took about 2 hours and this temperature is above the critical temperature of n-heptane of 267° C.(513° F.). After reading 400° C. an additional 500 cc of n-heptane was pumped to the autoclave until one more hour had elapsed. The autoclave was then vented to a flask and the reactor was flushed with nitrogen.

The total contents were distilled in a batch distillation column to a cut point of 120° C. at 1.47 psia. The residue was further distilled to 120° C. at 10 mm Hg. The yield of final product (heptane free) was 94.0 grams. Of the total heptane and diatomaecous earth used of 2039 total grams the loss was only 24.4 grams of 1.2% based upon total weight. This 94.0 grams in 500 grams of diatomaceous earth was equivalent to 48.4 gallons of oil yield per ton of earth using density by Fischer assay of 0.962 average g/cc gravity of the product oil. In comparison 2 samples of 100 grams/each of the same oil laden diatomaceous earth was retorted by Fischer assay to yield an average of 32.2 gals/ton. Thus the yield by supercritical extractino of this diatomaceous earth was about 50.5 % greater than yield by Fischer assay.

EXAMPLE 2

(Comparative Run)

"Asphalt Ridge" Tar Sand was supercritically extracted with n-heptane. 750 grams of "Asphalt Ridge" Tar Sand were placed in an unstirred reactor and purged with nitrogen. N-heptane solvent was pumped at 7 grams per minute to the reactor and the reactor was heated to 400° C. (752° F.) and 1500 psig. This took about 2 hours and this temperature is above the critical temperature of n-heptane of 267° C.(513° F.). After reaching 400° C. additional 500 grams of n-heptane was added to the autoclave by pumping at 400° C. until about one more hour had elapsed. The autoclave was then vented to a flask and the reactor was flushed with nitrogen.

The total autoclave contents were distilled in a batch distillation column to a cut point of 120° C. at 14.7 psia. The residue was further distilled to 120° C. at 10 mm Hg. The yield of final product (heptane free) was 86.7 grams. Of the total heptane and tar sand used of 2187.2 total grams, the loss was only 15.7 grams or 0.72% based on total weight.

This 86.7 grams in 750 grams of tar sand was equal to 30.55 gals of oil yield per tar using a density by Fischer assay of 0.9088 avg g/cc of the product tar oil. In comparison this "Asphalt Ridge" tar sand was retorted by Fischer assay to yield an average of 23.5 gal/ton. Thus the yield by supercritical extraction of tar sand was about 30.55-23.5/23.5 ×100 or 30.0% greater than the yield by Fischer assay.

With Example 1 compared to Example 2 the improvement achieved by supercritical extraction as compared to Fischer retorting for diatomaceous earth compared with tar sand was 150.5/130.0 or 1.158 or 15.8% higher for diatomaceous earth compared with tar sand.

This result shows that diatomaceous earth appears to be uniquely suitable for supercritical extraction. Very high yields of hydrocarbon recovery therefore appear possible utilizing the process of this invention.

In FIG. 1 of the drawing a first embodiment of the extraction stage of the process and apparatus of this invention is shown. Diatomaceous earth is fed from a lock hopper 1 into a mixing chamber 2. In this mixing chamber 2 the diatomaceous earth is blended, e.g. by means of a stirrer 3 with solvent introduced from fresh solvent line 4 and/or recycle solvent line 5 by means of a compression pump 6. The diatomaceous earth/solvent blend is passed via line 7 to heater 8. In heater 8 a fuel introduced via line 9 is combusted and the diatomaceous earth/solvent blend is heated by indirect heat exchanger with the combustion gases in heat exchange conduit 10.

The diatomaceous earth/solvent blend now under supercritical conditions is introduced via line 11 into a loop reactor 12 and is moved in a loop in this loop reactor by means of, e.g. an impeller 13. The loop reactor 12 is provided with at least two settling legs 14, each being equipped with a set of two valves 15. These settling legs are operated so that solid material can settle in one settling leg, the upper valve being open the lower valve being closed. Then the upper valve of the settling leg is closed and the lower valve is opened to discharge the concentrated slurry of solid residue and fluid comprising solvent and extracted hydrocarbon. The settling and flushing operation is alternated between the settling legs and it is possible to achieve a fairly constant flow of slurry from conduit 16.

In accordance with this invention it is possible to operate the extractor loop 12 at a much lower solids concentration than the one in mixing chamber 2 or line 16. Thereby a gradual enrichment of the fluid in the loop reactor 12 is possible. The loop reactor may either be flushed periodically completely to remove the oil rich fluid or the reactor can be operated until an equilibrium is reached. The advantage of this variation of the inventive process is that the actual extraction in the loop reactor 12 occurs at a much lower solids concentration thereby allowing a more efficient extraction. The "reconcentration" occurs in the settling legs.

A second embodiment of the extraction portion of the process and apparatus of this invention is shown in FIG. 2. The same units have been labelled with the same numerals. Lock hopper and pressure pump have been omitted. Instead of the loop reactor 12, a series of stirred contactors 120, 121 and 122 are employed. These contactors are arranged in series and each of the contactor is equipped with a stirring mechanism 123, 124, 125, respectively.

FIG. 3 shows a first variation of the recovery system or separating unit of the process and apparatus of this invention. The slurry of extracted and hydrocarbon depleted diatomaceous earth and fluid of solvent and extracted hydrocarbons is passed from line 16 into a solids/liquid separation unit 19. This unit can be a cyclone or a series of cyclones, a simple settling vessel or a filter unit. In the arrangement shown in FIG. 3 a cyclone or settling unit is contemplated. An overhead of stream of substantially solid free hydrocarbons is withdrawn from this separating unit 19 via line 20. This material in line 20 is passed through a heater 35 to a separator 21. From the separating unit 21 an overhead stream being substantially extract free solvent is withdrawn via line 22. A bottoms stream containing the extracted hydrocarbon values is withdrawn from the separator unit 21 via line 23. This bottoms streams is further subjected to solvent recovery in unit 24 which may be a stripper unit. A solvent stream leaves this solvent recovery unit 24 via line 25. Steam can be injected into the solvent recovery unit via line 26. Substantially solvent free hydrocarbon material is removed from unit 24 via line 27. This hydrocarbon material can be subjected to further processing such as cracking or other refining operations. Streams 22 and 25 are combined in solvent stream line 41.

From the fluid/solids separator unit 19 a solid material containing some fluid is withdrawn, e.g. via a series of rotary valves or locks 28. The high pressure of this solid material is thereby gradually reduced. The produce is then introduced via line 29 into a dryer 30. This dryer 30 can be heated. Evaporated solvent leaves the dryer 30 via line 31. The vast majority of the solvent to be recovered from the solid material in line 29 is already present as a solvent vapor in line 29 in view of the substantial reduction in pressure occurring in the valves 28. The dryer 30 therefore has primarily a gas/solid disengaging function. However, it is within the scope of this invention to heat the dryer such as to recover any remaining solvent from the solid particles.

The solvent vapors from line 31 are at a significantly lower pressure than the solvent leaving the separator 21. The solvent vapors in line 31 are cooled and condensed in unit 32. A liquid solvent stream is passed via line 33 and pump 34 and combined with the stream in line 41. If needed, the temperature of the solvent recycle stream in line 5 can be changed by passing it through a heat exchanger 17.

A yet further variation of the recovery system or separation unit of this invention is shown in FIG. 4. Instead of a cyclone or settler unit 19 this embodiment utilizes a filter system as the solid/fluid separator. The filter system in FIG. 4 comprises at least two filter units 42. These filter units are operated in tandem for allowing backwashing and regeneration of the filter. The valve mechanism has been omitted in FIG. 4 for clarity. A filtrate effluent substantially free of solids is withdrawn from the filters 42 via line 43. The solid material or residue is withdrawn from the filters periodically via line 44. The remaining unit are substantially the same as those shown in FIG. 3.

Reasonable variations and modification which will become apparent to those skilled in the art can be made from this invention without departing from the spirit and scope thereof.

What is claimed is:

1. Apparatus for supercritical extraction of diatomaceous earth comprising
    (a) source means for providing a source of diatomaceous earth containing recoverable hydrocarbons,
    (b) operatively connected to said source means an inlet chamber wherein said diatomaceous earth and a solvent can be contacted with each other,
    (c) a loop reactor connected to said inlet chamber, said loop reactor having connected thereto at least two settling legs provided with valves for periodic removal of settling mixtures comprising diatomaceous earth and solvent and extracted hydrocarbon values,
    (d) connected to said settling legs solid/fluid separation means, having a fluid outlet and a solids outlet,
    (e) separator means connected to said fluid outlet which separator means have an overhead outlet for solvent removal and a bottom outlet for the removal of heavier materials,
    (f) dryer means connected to said solids outlet of said solid/fluid separator means having a gas outlet and a solids outlet, said gas outlet being directly or indirectly connected to the inlet of said separator means,
    (g) recycle means connected to said overhead outlet and to said inlet chamber for recycling solvent from said separator means to said inlet chamber.

* * * * *

UNITED STATES PATENT AND TRADEMARK OFFICE
CERTIFICATE OF CORRECTION

PATENT NO. : 4,741,806

DATED : May 3, 1988

INVENTOR(S) : James Scinta

It is certified that error appears in the above-identified patent and that said Letters Patent is hereby corrected as shown below:

Column 8, line 11, "settling" should be ---settled---.

Signed and Sealed this

Twentieth Day of September, 1988

Attest:

DONALD J. QUIGG

Attesting Officer

Commissioner of Patents and Trademarks